(12) United States Patent
Zinjuwadia et al.

(10) Patent No.: US 7,864,706 B1
(45) Date of Patent: Jan. 4, 2011

(54) BORDER GATEWAY PROTOCOL PEER DAMPENING

(75) Inventors: Kalpesh Zinjuwadia, San Jose, CA (US); Arun Viswanathan, Cupertino, CA (US)

(73) Assignee: Force 10 Networks, Inc., San Jose, CA (US)

( * ) Notice: Subject to any disclaimer, the term of this patent is extended or adjusted under 35 U.S.C. 154(b) by 272 days.

(21) Appl. No.: 12/080,749

(22) Filed: Apr. 4, 2008

(51) Int. Cl.
*H04L 12/28* (2006.01)
(52) U.S. Cl. .................. 370/254; 370/252; 370/401
(58) Field of Classification Search ............. 370/254, 370/401, 255, 352, 353, 252
See application file for complete search history.

(56) References Cited

U.S. PATENT DOCUMENTS

| | | | |
|---|---|---|---|
| 7,355,983 B2 * | 4/2008 | Scudder et al. ............ 370/242 |
| 7,558,877 B1 * | 7/2009 | Fedyk et al. ................ 709/242 |
| 7,647,426 B2 * | 1/2010 | Patel et al. .................. 709/239 |
| 2005/0025118 A1 * | 2/2005 | Hao et al. ................... 370/351 |
| 2006/0198322 A1 * | 9/2006 | Hares ......................... 370/254 |
| 2009/0046579 A1 * | 2/2009 | Lu et al. ..................... 370/225 |
| 2009/0125613 A1 * | 5/2009 | Means ........................ 709/220 |
| 2009/0182896 A1 * | 7/2009 | Patterson et al. ........... 709/241 |

* cited by examiner

*Primary Examiner*—Ayaz R Sheikh
*Assistant Examiner*—Chuong T Ho
(74) *Attorney, Agent, or Firm*—Robert Schuler

(57) ABSTRACT

A method is disclosed for preventing an unstable BGP Peer from repeatedly initializing unstable BGP connections. In one embodiment, BGP speakers are penalized for causing errors that result in BGP restarts. When a speaker accumulates enough penalty points, its peer notifies it that it has been dampened (prevented from establishing a BGP connection). A memory decay function allows the speaker to automatically attempt a new connection once a given amount of time has passed. The method allows at least two, and possibly more, BGP speakers to avoid network and processor costs from servicing unstable BGP peerings.

10 Claims, 4 Drawing Sheets

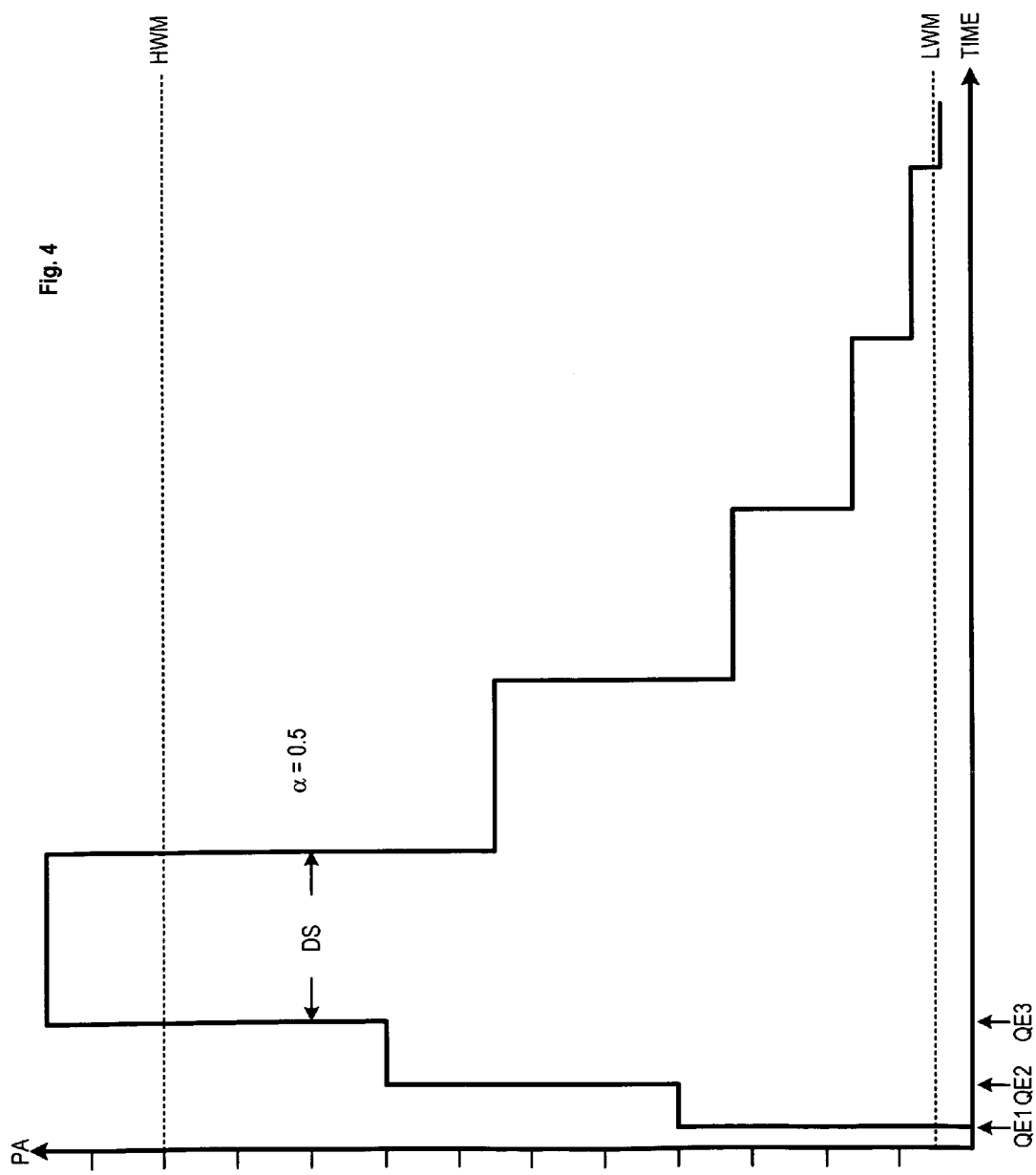

BORDER GATEWAY PROTOCOL PEER DAMPENING

BACKGROUND

1. Field of the Invention

The present disclosure relates generally to packet networks, and more particularly to the operation of exterior gateway protocols within such networks.

2. Description of Related Art

In a packet network, "nodes" or "routers" share network address information that allows each node or router to forward packets toward their respective destination networks. For networks defined using the Internet Protocol, each node is provisioned with a network address that identifies the particular network the system is on, and with a system or host address that uniquely identifies the node. These addresses are shared among neighboring nodes to allow each router to build a "tree" with itself as the root node and next-hop paths from itself to every address on the network.

Routers use IP network, subnetwork, and host addresses to forward routed traffic within a packet network "autonomous system" (AS) according to an interior routing (or gateway) protocol (an "IGP"). Generally, an AS comprises a set of routers that are commonly administered, communicate with each other using one or more common IGPs and routing metric sets, and communicate with routers outside of the AS using an inter-AS (or exterior) gateway protocol ("EGP"). Regardless of the internal AS architecture, the AS presents to the world outside the AS, through the EGP, a consistent picture of the destinations that are reachable through it.

The Border Gateway Protocol (BGP) is currently the primary EGP used to route packets between the large number of ASes that, collectively, make up the "Internet." BGP itself can function as either an interior gateway protocol or an exterior gateway protocol. When used as an EGP, BGP peers are located in different ASes. Each peer advertises to the other the networks/subnetworks that it can reach. BGP is a "path vector protocol"—BGP updates contain information detailing the AS-to-AS path that routing updates take to reach a router. From this path information, a BGP router can compare distance vectors for different possible routes to a destination and select a preferred route for each destination. BGP is defined in the Internet Engineering Taskforce (IETF) Request for Comments (RFC) 4271, "A Border Gateway Protocol 4 (BGP-4)," Y. Rekhter et al., Jan. 2006, which is incorporated herein by reference.

Each BGP speaker maintains a Routing Information Base (RIB) containing BGP update information. Within the RIB, unprocessed routing information received from the BGP speaker's peers is stored as "Adjacent-RIBs-In" information. As the BGP speaker processes the information, it creates "Local-RIB" information, indicating the preferred routes that the BGP speaker has actually selected to use. From among these selected Local-RIB routes, the BGP speaker selects "Adjacent-RIBs-Out" information to be advertised to each specific peer. When two BGP speakers are first peered, each sends the other, through a set of updates, the entire appropriate contents of the Adjacent-RIBs-Out database. Afterwards, incremental updates are used to inform the peer of new, changed, or withdrawn routes. Periodic KeepAlive messages exchanged by the peers insure each that the BGP connection is alive. Should the connection be closed for any reason by a BGP speaker, the speaker should send a Notification message, supplying a reason the connection is being closed, to the peer. When the BGP connection is closed, all routes that each peer has advertised to the other are removed from the RIB.

BRIEF DESCRIPTION OF THE DRAWINGS

FIG. 4 contains a graph illustrating dampening behavior according to an embodiment.

DETAILED DESCRIPTION

When a BGP speaker restarts its session with a peer, each speaker deletes all routes advertised by the other from its RIB. Both speakers then attempt to bring up the adjacency. Once a renewed session is established, each speaker applies it local policies to its local RIB and advertises an appropriate set of Adjacent-RIBs-Out to the peer.

Each BGP session restart is costly to a peer. When an existing session is terminated, any affected routes in the Local-RIB must be recalculated, and the affected routes must be withdrawn (including issuing new updates) from Adjacent-RIBs-Out if they have been shared with other peers. The restart results in a full Adjacent-RIBs exchange between the restarting peers, plus any cascaded Adjacent-RIBs exchanges with other peers as a result. Each Adjacent-RIBs exchange may consume significant network bandwidth, since in some applications the updates may describe routes to the entire Internet. Substantial CPU (Central Processing Unit) time may be required to process the existing Local-RIB, create the appropriate Adjacent-RIBs-Out updates, digest the received Adjacent-RIBs-In to determine which routes should be placed in the Local-RIB, and advertise any changed Local-RIB routes to other peers.

It has now been discovered that a BGP connection that consistently fails and restarts ("flaps") can, and in many cases should, be forced down automatically. Such a condition is most likely the result of some sort of configuration error or persistent hardware error that will not be resolved by continued restart attempts. The embodiments presented below describe solutions for "dampening" a BGP peer with which a BGP speaker repeatedly fails to establish a session. Dampening allows the network to stabilize and preserves router CPU time and network bandwidth for useful purposes.

Figure 1:
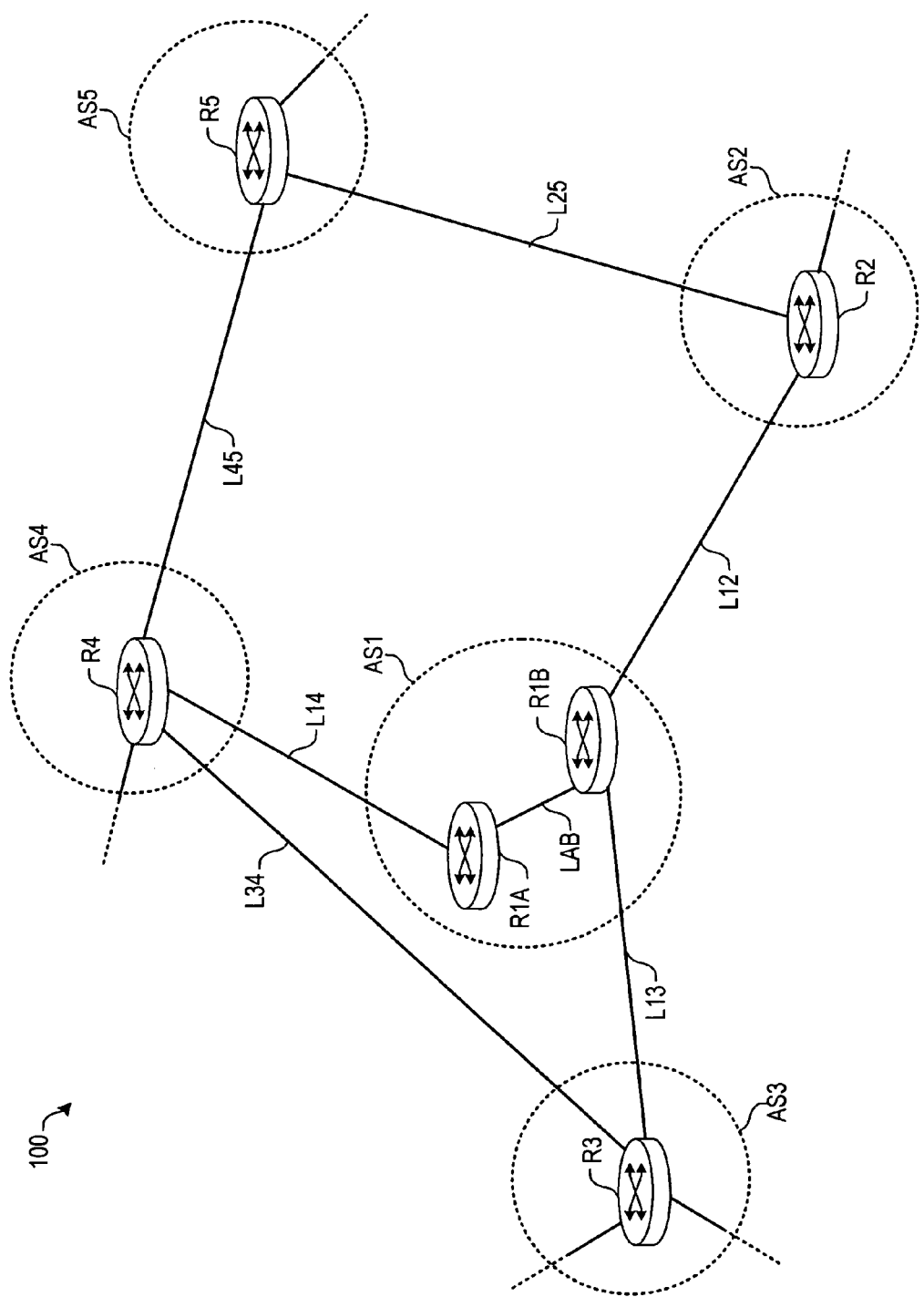
FIG. 1 shows an exemplary high-level network view with multiple BGP speakers, according to an embodiment.

FIG. 1 shows an exemplary network segment 100, comprising 5 ASes: AS1, AS2, AS3, AS4, and AS5. Within AS1, two routers R1A, R1B are connected by a link LAB, and share routing information using IBGP. Within each other AS ASn, a router Rn is shown (further internal details of the ASes have been omitted for clarity). R1B connects to R2 via a link L12 and connects to R3 via a link L13. R4 connects to R1A via a link L14, to R3 via a link R34, and to R5 via a link L45. R2 and R5 also connect via a link L25. All depicted routers have EBGP enabled between their peers in neighboring ASes.

Figure 2:
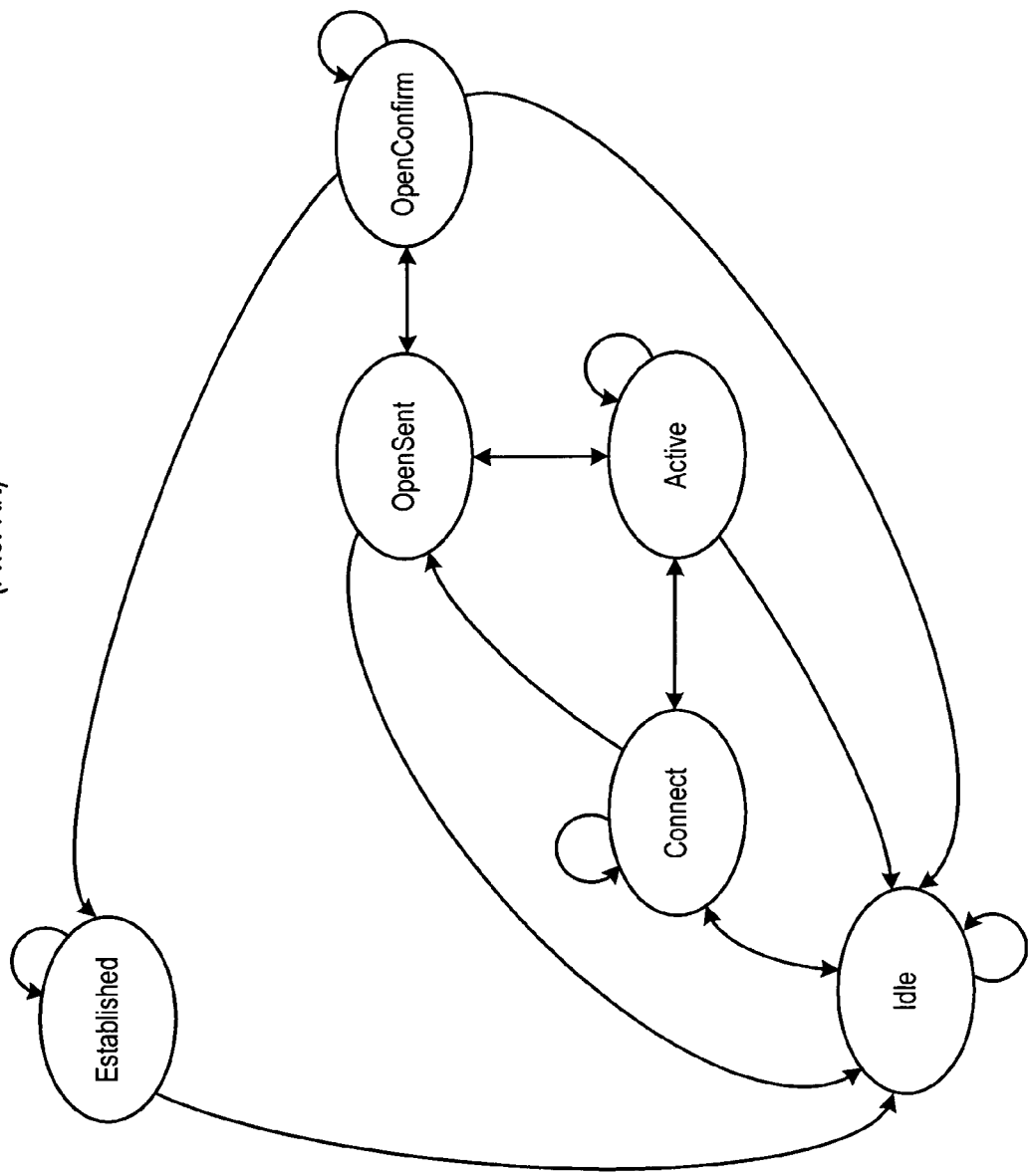
FIG. 2 illustrates a prior art BGP state diagram.

In operation, two routers are manually configured to become BGP peers. Each BGP speaker maintains a state machine for each configured BGP peer, e.g., as shown in FIG. 2. When manually or automatically started, the state machine is initialized to an Idle state, where it ignores connection requests from the peer, initializes resources, attempts to establish a TCP connection with the BGP peer, and listens for a TCP connection from the peer (BGP connections use Transmission Control Protocol (TCP) as a transport protocol).

The Connect state is a wait state that is entered while the router waits for TCP negotiation to complete. When the TCP connection fails to open, the state machine transitions to the Active state. When the TCP connection successfully opens, the state machine sends an OPEN message to the peer and transitions to the OpenSent state. The OPEN message indicates the AS within which the speaker resides, the version of BGP it uses, a BGP identifier for the speaker, and a group of session parameters.

In the Active state, the router listens for an incoming connection, and may attempt another TCP connection and transition back to the Connect state if so configured. When the state machine ends up back in the Active state a second time, it transitions to the Idle state, and restarts the BGP connection process.

In the OpenSent state, the router listens for a BGP OPEN message from its peer. When the message is received, the router runs a validity check on the message contents. When the contents are as expected, the router sends a KEEPALIVE message to confirm the OPEN and transitions to OpenConfirm. When the contents have some sort of error, the router sends a NOTIFICATION message to the peer, indicating the error that was found, and then transitions back to the Idle state.

In the OpenConfirm state, the router listens for a KEEPALIVE or NOTIFICATION message from its peer. Upon receiving a KEEPALIVE message, BGP transitions to the Established state. Upon receiving a NOTIFICATION message, the state machine transitions back to Idle.

In the Established state, the router begins transmitting UPDATE messages to, and receiving UPDATE messages from, the peer. Received UPDATEs, if correct, are entered in the Adjacent-RIBs-In structure. Any error in a received UPDATE message, or the expiry of a Hold Timer without receiving a scheduled KEEPALIVE message, causes the state machine to send a NOTIFICATION message to the peer and a transition back to Idle.

Each NOTIFICATION message includes an error code. Some possible errors are a message header error, on OPEN message error, an UPDATE message error, an expired Hold Timer, a state machine error, and cease—the closing of the session that is not caused by a fatal error. Some error types can indicate, through use of subcodes, additional details as to the type of error encountered.

Referring back to FIG. 1, assuming that each router has been configured as a BGP peer with which is shares a link, each router will go through the process above to become a BGP speaker with each peer. As each router learns which routes it prefers to each destination, the network will converge to a stable configuration. For instance, routers in AS3 will likely install L13 as a next hop to reach destinations in AS2 and beyond, but will install L32 as a next hop to reach destinations in AS5 and beyond. Where two possible routes appear tied (e.g., should R4 install L14 or L45 as a next hop to reach destinations in AS2 or beyond?), a set of tiebreaking rules determine which route is installed in the Local-RIB.

It has been observed that the error/restart history of a BGP peer is often predictive of the peer's future stability. In one embodiment, a BGP speaker maintains history statistics for identified "flapping" events on a connection/connections that it attempts with a peer. When the level and/or frequency of "flapping" events reaches a defined level, the speaker "dampens" the peer, e.g., it notifies the peer that it has been dampened and then does not attempt to reopen a TCP connection with the peer. Once a peer has been dampened, manual or automatic means may be required to re-enable the connection. For instance, in FIG. 1, L12 may be an intermittently bad connection, or some sort of configuration error could exist in the peer relationship between R1B and R2. R1B can detect that the peer relationship is flapping and dampen the BGP session with R2. This allows the network to converge to a stable configuration, even though it must use routes that bypass the R1B to R2 link. Preferably, a network administrator is made aware of the dampened condition, and can investigate and repair the problem causing the flapping BGP connection.

In one embodiment, a user can define the type of flapping events that will trigger a new BGP state machine "dampened" state. Some exemplary events are: a "peer-unreachable" event; a "message header error" event; an "open-error" event; an "update error" event; a "hold-timer-expiry" event; and a "peer closed connection for reason other than dampening" event. Either all of these events, or a specified subset thereof, can be used to penalize a BGP peer. When desired, a finer-grained event set (based on information such as the subcodes associated with some error causes) can be defined.

In one implementation, when the BGP state machine transitions back to the idle state, the state machine determines whether the event causing the transition is a qualified event. When it is, the peer is penalized by adjusting its dampening statistics (dampening statistics should be stored in a memory structure that is maintained by BGP for each BGP identifier, outside of the ephemeral state that is established for any particular BGP session attempt). For instance, each configured peer BGP identifier can be identified with a memory structure containing three elements: the BGP identifier, a penalty accumulator, and a decay timer. At any given time, the penalty accumulator (which is initialized to zero) indicates the current penalty accumulated by the BGP peer with the given identifier. The decay timer signals the process as to when to perform periodic reductions to the penalty accumulator, e.g., by a preset fraction. When a qualified event occurs, BGP accesses the memory structure, adjusts the penalty accumulator by a penalty amount, and resets the decay timer. The penalty amount can be a preset value applied to all qualified events, or can vary depending on the perceived severity of the event (for instance, recovering from an update error or hold-timer-expiry error is typically more costly than recovering from a peer-unreachable event). The penalty amount can alternately be based on the changes required to the RIB as a result of the failure, the size of Adj-RIBs-In that will now have to be retransmitted, and/or any downstream Adj-RIBs-Out changes as a result, e.g., the "cost" of restart at a given point in the peer relationship.

When the decay timer expires, the penalty accumulator is reduced, e.g., by a preset fraction of its current value. This allows relatively infrequent restarts to occur without a peer eventually becoming dampened, as the penalty accumulator value eventually loses memory of past restarts.

Figure 3:
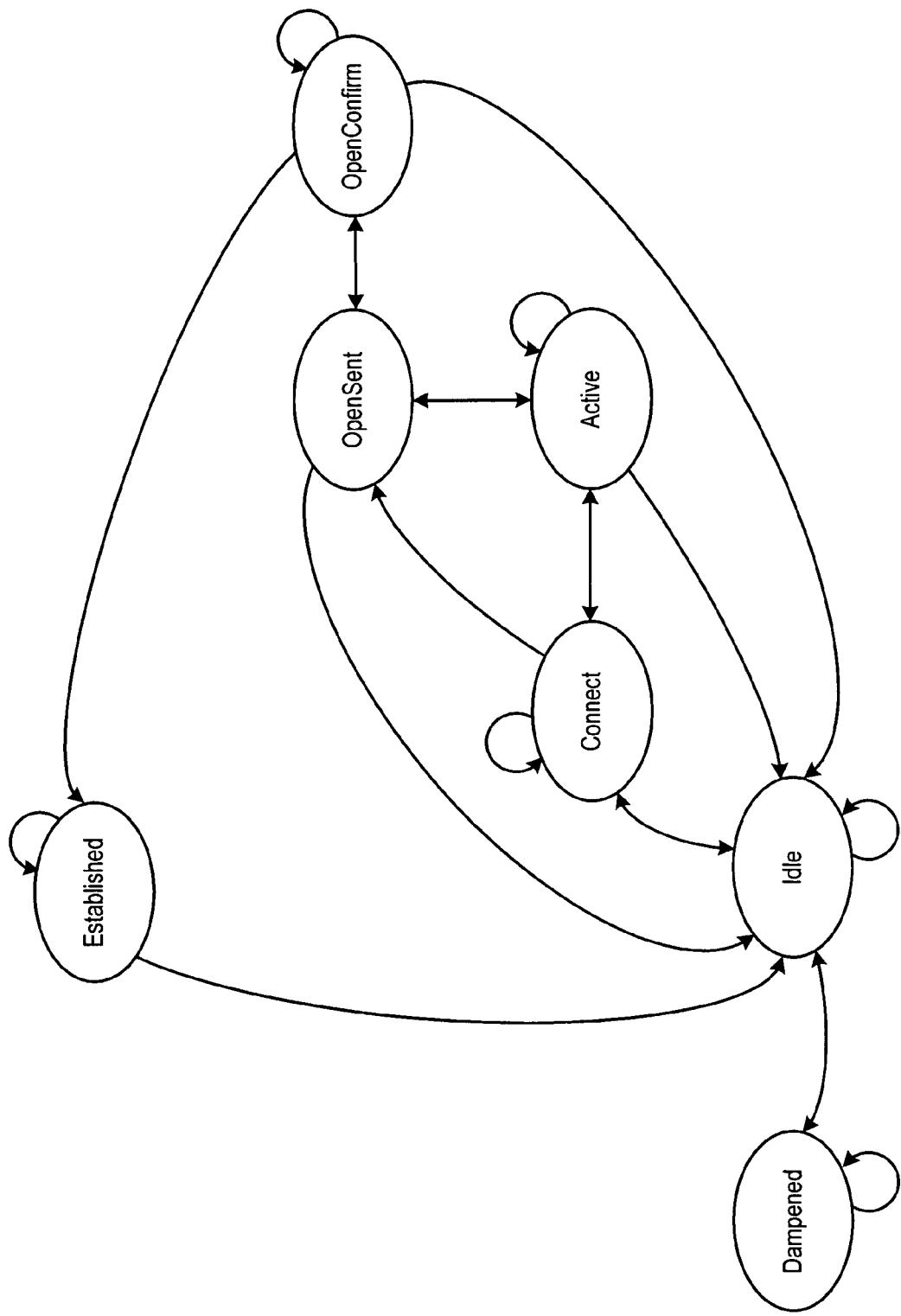
FIG. 3 illustrates a BGP state diagram according to an embodiment.

Upon a transition to the Idle state where the penalty accumulator exceeds a preset high water mark HWM, the BGP state machine transitions to a dampened state, as shown in FIG. 3. The BGP peer remains in the dampened state until a given criteria are met for automatic release of the state machine back to the Idle state, or, if so configured, until the penalty accumulator PA is manually reset.

FIG. 4 shows a time history of a penalty accumulator value PA in one example. PA is initialized to 0, but due to three qualified events QE1, QE2, QE3, PA rises until is surpasses a high water mark value HWM. Once PA passes HWM, the state machine enters the dampened state. The decay timer is initialized with a decay-start value DS. At the expiry of this timer, PA is reduced using the exponential decay equation $$PA = PA(1-\alpha),$$

where in this example $\alpha=0.5$. PA is then compared to a low water mark value LWM. When PA still exceeds LWM, the decaytimer is reinitialized with the decay-start value DS, the state machine remains in the dampened state, and the decay algorithm repeats when the timer expires again. Once PA decreases below LWM, the state machine transitions out of the dampened state to Idle, and the state machine may try to establish the BGP adjacency anew.

The decay algorithm can be allowed to run for all BGP peers, whether currently dampened or not. This allows infrequent restarts with a peer to occur without a peer eventually becoming dampened, as the penalty accumulator value eventually loses memory of past restarts.

Should an administrator decide to manually enable a dampened peer (e.g., after locating and repairing a configuration error), the administrator can be allowed to clear the dampening state history for the peer, causing the BGP speaker to transition from the Dampened state back to the Idle State, from which a new connection can be attempted.

Should an administrator decide to permanently damp a consistently troublesome peer, LWM can be set to 0 (or less, if allowed). As the penalty accumulator can never go below zero, such a peer would remain disabled until manually restored.

When a peer has been dampened by a BGP speaker, it is preferable that the BGP speaker inform the peer of this occurrence. The existing NOTIFICATION message framework is extended in an embodiment such that a "Peer Dampened" error can be transmitted to the peer before the connection is closed. A peer receiving such a notification should preferably take no active steps regarding the connection, e.g., it may remain in the Active state and wait for the peer that sent the Peer Dampened error to attempt to reestablish contact. Were the dampened peer to take action to penalize the BGP speaker for not responding while it is in the dampened state, the two peers could enter an undesirable synchronized state where each dampens the other, and at least one has dampened the other at any given time, preventing the reestablishment of a BGP session.

Other uses can be made of the dampening history. Network management protocols can be extended to generate alert messages when a BGP peer is dampened or reenabled. A management information base can also be extended to report a Dampened state. The dampening history can also be used as a BGP tiebreaker. When two or more potential paths to a destination have equal BGP routing distances, a series of tiebreakers is examined until a single winner is found. In an embodiment, before the currently existing tiebreaker based on BGP Identifiers, a new tiebreaker can be inserted that is based on the penalty accumulator values. A rule that removes from consideration all potential routes that do not have the minimum penalty accumulator value from among the potential routes will prefer routes that do not usually flap. When more than one potential route has the minimum, longer term statistics, such as a cumulative count of the number of times the BGP Identifier has been dampened, can break any remaining ties. Should neither of these new tests resolve all ties, the path selection criteria can resume with the remaining existing tiebreakers.

The parameters that control BGP Peer Dampening can include penalty values, qualified events, decay times, decay values, high water marks, low water marks, etc. Where one desires a consistent application of a parameter set among a peer group, a configuration command can set the desired behavior on the entire group. An administrator can then select to override the group settings for a particular group member, if so desired.

The preceding examples illustrate some methods for controlling unstable BGP peer relationships. The specific algorithms disclosed are but one method for implementing the concepts of identifying peers with an unstable connection history, and acting to reduce deleterious effects from the instability of such peers.

In a given embodiment, a management processor (or group of cooperating processors) generally will be responsible for operating the border gateway protocol on a given router. The management processor(s) can maintain, in their memory space, history statistics necessary to implement an embodiment. Such functions will generally be expressed as machine-executable software stored on a computer-readable medium, with the medium being local and/or remote to the processor (s) executing the software.

Although several embodiments and alternative implementations have been described, many other modifications and implementation techniques will be apparent to those skilled in the art upon reading this disclosure. Although a specific Border Gateway Protocol (BGP-4) has been used to illustrate the embodiments, other protocols with similar characteristics to BGP-4 have existed and will exist in the future. Thus usage of the generic term Border Gateway Protocol herein is intended to apply to BGP-4 and other routing protocols with similar characteristics that would allow them to benefit from the techniques described herein.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of operating a packet network router, the method comprising:
   tracking, for a given peer with which the packet network router is configured to exchange routing information, at least one metric related to the stability of the routing peer relationship between the packet network router and the peer, the at least one tracking metric comprising accumulating penalties when the peer relationship is restarted;
   basing a degree of the penalty on the type of event that causes the peer relationship to restart;
   when the accumulated penalties comprising the at least one tracked metric are compared to exceed a first threshold, preventing the peer from exchanging routing information with the packet network router;
   reducing the level of accumulated penalties with time, while the peer is prevented from exchanging routing information with the packet network router; and
   comparing the reduced level of accumulated penalties to a second threshold, and automatically inactivating the routing information exchange prevention mechanism when the reduced level of accumulated penalties meets a preset criterion with respect to the second threshold.

2. The method of claim 1, wherein penalties are accumulated for selected reset events that cause the peer relationship to restart.

3. The method of claim 1, further comprising basing the degree of penalty assessed on the cost of restarting the peer relationship.

4. The method of claim 1, wherein the significance of an accumulated penalty decays with time.

5. The method of claim 1, wherein preventing the peer from exchanging routing information comprises placing a routing exchange mechanism in a dampened state from which connection attempts by the peer are ignored.

6. The method of claim 5, further comprising notifying the peer that it has been dampened when entering the dampened state.

7. The method of claim 1, further comprising using routing cost metrics to select between multiple possible routes to a given destination, and, when multiple possible routes to a given destination are tied based on routing cost metrics, attempting to break the tie based on comparing at least one of the metrics related to the stability of the peer relationship for each peer associated with one of the multiple possible routes.

8. The method of claim 7, wherein comparing at least one of the metrics related to the stability of the peer relationship comprises comparing the number of times each peer has been prevented from exchanging routing information due to historical instability.

9. A packet network router comprising:
one or more processors;
means for the one or more processors to track, for a given peer with which the packet network router is configured to exchange routing information, at least one metric related to the stability of the routing peer relationship between the packet network router and the peer, the at least one tracked metric comprises accumulating penalties for selected reset events that cause the peer relationship to restart and basing a degree of the penalty on the type of event that causes the peer relationship to restart;
means for preventing the peer from exchanging routing information with the packet network router when the accumulated penalties comprising the at least one tracked metric are compared to exceed a first threshold;
means for reducing the level of accumulated penalties with time, while the peer is prevented from exchanging routing information with the packet network router; and
means for comparing the reduced level of accumulated penalties to a second threshold, and automatically inactivatng the routing information exchange prevention mechanism when the reduced level of accumulated penalties meets a preset criteria with respect to the second threshold.

10. The apparatus of claim 9, wherein the means for preventing the peer from exchanging routing information comprises placing a routing exchange mechanism in a dampened state from which connection attempts by the peer are ignored.

* * * * *